(12) United States Patent
Sato et al.

(10) Patent No.: US 8,203,493 B2
(45) Date of Patent: Jun. 19, 2012

(54) PORTABLE WIRELESS DEVICE

(75) Inventors: Kenichi Sato, Miyagi (JP); Daigo Imano, Miyagi (JP); Hironori Kikuchi, Miyagi (JP); Yasuhiro Katajima, Kanagawa (JP); Tatsuya Sano, Miyagi (JP); Nobuhiro Iwai, Kanagawa (JP)

(73) Assignee: Panasonic Corporation, Osaka (JP)

( * ) Notice: Subject to any disclaimer, the term of this patent is extended or adjusted under 35 U.S.C. 154(b) by 234 days.

(21) Appl. No.: 12/812,452

(22) PCT Filed: Dec. 26, 2008

(86) PCT No.: PCT/JP2008/003998
§ 371 (c)(1),
(2), (4) Date: Jul. 9, 2010

(87) PCT Pub. No.: WO2009/090721
PCT Pub. Date: Jul. 23, 2009

(65) Prior Publication Data
US 2010/0277377 A1    Nov. 4, 2010

(30) Foreign Application Priority Data
Jan. 15, 2008 (JP) ................................. 2008-006314

(51) Int. Cl.
*H01Q 1/24* (2006.01)
*H01Q 1/42* (2006.01)
(52) U.S. Cl. ........................................ 343/702; 343/872
(58) Field of Classification Search .................. None
See application file for complete search history.

(56) References Cited

U.S. PATENT DOCUMENTS

| 6,078,292 A | 6/2000 | Koyanagi et al. |
| 6,636,725 B1 * | 10/2003 | Yoshimoto ................. 455/575.7 |
| 6,943,739 B1 * | 9/2005 | Rousu et al. .................. 343/702 |
| 2006/0028380 A1 | 2/2006 | Harano |

FOREIGN PATENT DOCUMENTS

| JP | 10126304 A | 5/1998 |
| JP | 2006050496 A | 2/2006 |
| JP | 2006166072 A | 6/2006 |
| JP | 2007201762 A | 8/2007 |
| WO | 2004042947 A1 | 5/2004 |

OTHER PUBLICATIONS

International Search Report relating to International Application No. PCT/JP2008/003998, mailed Apr. 7, 2009, 2 pages.

* cited by examiner

*Primary Examiner* — Trinh Dinh
(74) *Attorney, Agent, or Firm* — Seed IP Law Group PLLC (57) ABSTRACT

Provided is a portable communication device, specifically a portable wireless device which is thin while maintaining excellent reception sensitivity even when the device is laid on a metal top panel. As such device (100), a foldable portable cellular phone (100) is provided with a battery box (117) opened on the side of a rear surface (115), and a circuit board (121) having an antenna power feed point (124) is arranged inside a lower case (114). The battery box (117) is covered with a battery cover section (140) removably attached to the lower case (114). The battery cover section (140) is formed of a member having conductivity, and attached to the lower case (114) by having contact point members (151, 152) in between for carrying a current to a reinforcing conductive plate (125) which is to be a GND layer of the circuit board (121). The battery cover section (140) attached to the lower case (114) is electrically connected to the reinforcing conductive plate (125) by making the battery cover section abut to contact point members (151, 152).

15 Claims, 8 Drawing Sheets

PORTABLE WIRELESS DEVICE

RELATED APPLICATIONS

This application is a 371 of PCT/JP2008/003998 filed Dec. 26, 2008, which claims priority under 35 U.S.C. 119 from JAPAN Patent Application No. 2008-006314 filed on Jan. 15, 2008, the contents of which are incorporated herein by references.

TECHNICAL FIELD

The present invention relates to a mobile radio apparatus such as a mobile telephone.

BACKGROUND ART

Conventionally, when a mobile radio apparatus such as a mobile telephone and a PHS is placed in a so-called laid state with its back surface contacting a metal top panel of a steel desk and so on, its antenna is arranged close to the metal plate. This causes a problem that mutual coupling occurs and the current of the opposite phase in the current flowing in the antenna flows in the metal surface, and this changes radiation directivity characteristics of the antenna and substantially changes impedance characteristics, thereby breaking the matching state and deteriorating antenna gain deteriorates.

By contrast with this, a small radio of Patent Document 1 in which a whip antenna is provided in this upper part of its back surface, is provided with ribs for lifting the upper part side of the body of the small radio from a metal plate when the small radio body is laid and adjusting sensitivity characteristics of the whip antenna to prevent deterioration in antenna gain and realize good reception sensitivity. Further, a method is adopted for performing impedance matching on a metal plate by switching between antenna elements or between matching circuits by switching elements, or, as disclosed in Patent Document 2, a method is adopted for providing good antenna sensitivity even on a metal top panel by adding, in a position apart from an antenna power feeding point on the GND of the circuit board inside the housing, one or a plurality of elements which improve antenna characteristics, in which one end parts of the element parts are grounded to one point on the ground of the circuit board and in which the other end parts of the element parts are open ends.

However, with a method of providing ribs in the back surface of the above-explained small radio, the thickness of the body increases in proportion to the ribs themselves and, therefore, this makes it difficult to make the small radio thinner, and the ribs have significant impact on design and, therefore, this causes a problem of spoiling the outlook. Further, the method of switching between antenna elements or between matching circuits by switching elements, makes the circuit configuration and control complicated, and not only increases cost but also is not desirable for miniaturization of the small radio. Furthermore, with a configuration of adding one or a plurality of elements which improve antenna characteristics, in which one end parts of the element parts are grounded to one point on the ground of a circuit board and in which the other end parts of the element parts are open ends, new parts are added, and therefore this does not allow miniaturization (i.e. thinning, in particular) of the housing itself which is demanded in recent years.

Unlike the above-described terminals that need to change, for example, the size or design of the terminals and that deteriorate antenna gain when the body is laid on a metal plate, for example, Patent Document 3 discloses a mobile radio apparatus that employs a configuration of actively utilizing for antenna gain a metal top panel on which the mobile radio apparatus is placed.

Patent document 3 discloses a communication terminal employing a configuration arranging a conductor having an auxiliary ground plate, which is placed on a metal top panel, and a radiation element, which is orthogonal and adjacent to this auxiliary ground plate. With this communication terminal, in a state where the communication terminal is placed on a metal plate, mirror effects make a high frequency current of an opposite phase flow in the metal plate, so that the high frequency current is canceled and antenna radiation is weakened. However, the mirror effects do not make components vertical to the metal plate cancel each other, so that the radiation element forms a dipole antenna symmetrically with respect to the metal plate.

Patent Document 1: Japanese Patent Application Laid-Open No. HEI10-126304
Patent Document 2: Japanese Patent Application Laid-Open No. 2006-050496
Patent Document 3: Domestic Re-Publication of PCT international Publication for Patent Application No. 2004-042947

DISCLOSURE OF INVENTION

Problems to be Solved by the Invention

However, with the communication terminal of Patent Document 3, a substrate that is provided to rise from the auxiliary ground plate and that is connected to the radio element, is arranged above the auxiliary ground plate. That is, the space to arrange a conductor having the radiation element and the auxiliary ground plate is required below the substrate. Thus, a predetermined thickness is required in the portion of the housing in which the conductor having the ground plate and the radiation element is arranged, and therefore there is a problem that this does not allow thinning of this portion and miniaturization (thinning, in particular) of the housing itself which is demanded in recent years.

It is therefore an object of the present invention to provide a mobile radio apparatus that can maintain good reception sensitivity when it is laid on a metal top panel, and that can be made thinner.

Means for Solving the Problem

The mobile radio apparatus according to the present invention employs a configuration which includes: a housing that has an operation surface and an outer surface which is exposed outside on an opposite side of the operation surface; an antenna; a substrate that is arranged inside the housing and that has a power feeding point of the antenna and a planar conductive layer; an electrically conductive first planar member that is detachably attached to the housing and that becomes a part of the outer surface; and a contact member that electrically connects with the conductive layer and that contacts the first planar member.

Further, the mobile radio apparatus according to the present invention employs a configuration which includes: a housing that has an outer surface; an antenna; a substrate that is arranged inside the housing and that has a power feeding point of the antenna and a planar conductive layer; an electrically conductive first planar member that is detachably attached to the housing and that becomes a part of the outer surface; and an electrically conductive contact member that electrically connects with the conductive layer and that contacts the first planar member.

Advantageous Effects of Invention

The present invention can maintain good reception sensitivity when it is laid on a metal top panel, and can be made thinner.

BEST MODE FOR CARRYING OUT THE INVENTION

Hereinafter, embodiments of the present invention will be explained in detail with reference to the accompanying drawings. Note that, although the present invention will be explained using a flip mobile telephone or PHS telephone with an antenna as a mobile radio apparatus, the present invention is not limited to the flip model, and may be the straight model.

Embodiment 1

Figure 1:
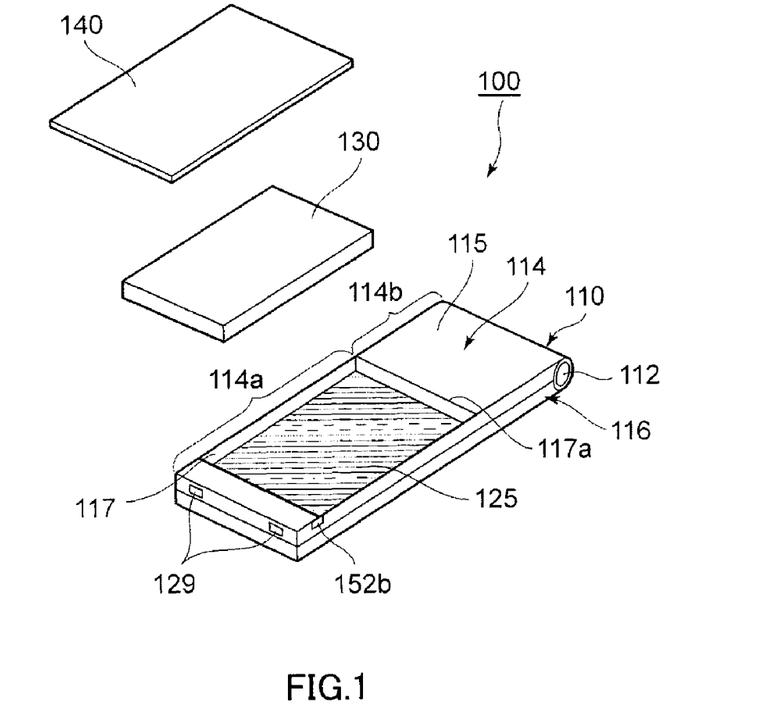
FIG. 1 is an exploded perspective view showing a main part configuration of a flip mobile telephone that is a mobile radio apparatus according to Embodiment 1 of the present invention.

FIG. 1 is an exploded perspective view showing a main part configuration of a flip mobile telephone that is a mobile radio apparatus according to Embodiment 1 of the present invention. Note that FIG. 1 shows the mobile telephone in a folded state, directing its back surface side upward.

Housing 110 of mobile telephone 100 shown in FIG. 1 has first housing 114 (hereinafter "lower housing") and second housing 116 (hereinafter "upper housing") that are attached to be mutually rotatable through hinge part 112.

These lower housing 114 and upper housing 116 are both formed in a rectangular shape from a plan view and are foldable through hinge part 112, and the operation surface of lower housing 114 and the display surface of upper housing 116 are arranged to face each other in the folded state.

In FIG. 1, in lower housing 114 of mobile telephone 100, open concave battery box 117 is formed in bottom surface 115 (corresponding to the back surface of housing 110) that is the outer surface exposed outside on the opposite side of the operation surface. Battery box 117 accommodates battery 130 inside and is detachably attached to lower housing 114 in a state battery 130 is accommodated, and its opening side is covered by battery lid part 140 (i.e. first planar member) that forms a part of back surface 115. Further, with folded mobile telephone 100 shown in FIG. 1, the surface of lower housing 114 facing upper housing 116 is virtually parallel to back surface 115 and is on the opposite side of back surface 115, and serves as an operation surface of keys. Further, lower housing 114 is formed with an insulating member, and is molded by resin.

Figure 2:
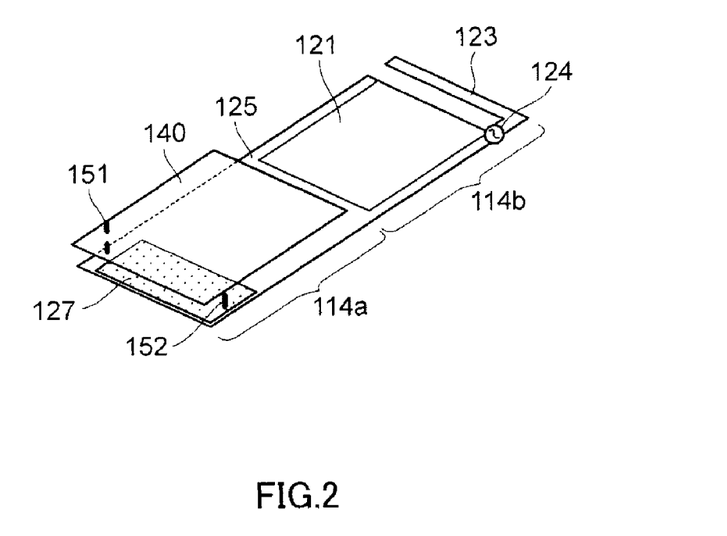
FIG. 2 is a schematic view showing a main part configuration of a mobile telephone according to Embodiment 1 of the present invention.

FIG. 2 is a schematic diagram showing a main part configuration of mobile telephone 100 according to Embodiment 1 of the present invention.

As shown in FIG. 2, inside lower housing 114 to which battery lid part 140 is attached, circuit board 121 for implementing each function such as a communication function in mobile telephone 100 is disposed.

Inside lower housing 114, this circuit board 121 is arranged in area 114b (i.e. upper area) that is virtually adjacent to area 114a (hereinafter "lower area") of the battery box which accommodates battery 130, in the longitudinal direction of lower housing 114 (i.e. up and down direction of lower housing 114) along back surface 115.

Circuit board 121 is provided with power feeding point 124 for feeding power to monopole antenna 123 arranged inside lower housing 114. Power feeding point 124 and an electronic component (not shown) mounted on circuit board 121 are connected to the planar conductive layer included in circuit board 121. Further, the conductive layer (i.e. GND layer) of circuit board 121 and reinforcing conductive plate 125 are electrically connected (i.e. short-circuited), and circuit board 121 and reinforcing conductive plate 125 are equipotential.

Inside lower housing 114, monopole antenna 123 is formed smaller by, for example, being bent to match the shape of the inner wall surface of the upper end surface part of lower housing 114. To be more specific, monopole antenna 123 is formed in an L shape by arranging a long strip part to extend along the axis of hinge part 112, that is, to extend along the inner wall surface of the upper end surface part of the lower housing, and by arranging a short strip part, which is orthogonal to the long strip part, to extend along the sidewall part that is adjacent to the upper end surface part of lower housing 114. Further, the short strip part connects to power feeding point 124 provided in the corner part of circuit board 121, through its end part spaced apart from the long strip part.

This circuit board 121 is attached in a state of electrical connection (i.e. GND-connection) with one surface side (i.e. upper side in FIG. 2) of reinforcing conductive plate 125 (i.e. second planar member and "insertion sheet metal" with the present embodiment) which is a flat member disposed over lower area 114a and upper area 114b.

Reinforcing conductive plate 125 is formed with a metal sheet, and connects to a GND wire of circuit board 121 and connects to a GND wire of circuit board 127 to form the GND planes of these circuit board 121 and circuit board 127.

Reinforcing conductive plate 125 is provided bridging between parts that face each other in the inner wall surfaces of the surrounding wall part of lower housing 114 to reinforce the strength of lower housing 114 itself that makes the height of the surrounding wall part lower, that is, that makes its thickness thinner. In other words, inside lower housing 114, reinforcing conductive plate 125 is provided bridging between parts that face each other in the surrounding wall part (i.e. side surface side, and upper and lower end surface sides) of the lower housing which rises from the peripheral part of bottom surface 115 of lower housing 114. Further, reinforcing conductive plate 125 includes operation keys inside lower housing 114, and receives force applied when the planar operation part disposed on the surface side of the lower housing is operated.

Reinforcing conductive plate 125 is formed inside lower housing 114 by insertion molding, and lower housing 114 itself is made thin compared to the case where reinforcing conductive plate 125 is disposed inside lower housing 114 separately.

On the back surface 115 side of reinforcing conductive plate 125 disposed inside lower housing 114, battery 130 is disposed next to circuit board 121 in the horizontal direction. That is, as shown in FIG. 1, the lower side area arranged in lower area 114a of reinforcing conductive plate 125 forms the bottom surface portion of battery box 117 that is open on the back surface 115 side, and, inside lower housing 114, circuit board 121 is not disposed in the area to accommodate battery 130. Hence, circuit board 121 is not disposed, so that the thickness of the portion to accommodate battery 130 inside lower housing 114 is secured as the area to accommodate battery 130.

In the lower side area that is arranged in lower area 114a of reinforcing conductive plate 125, circuit board 127 is disposed in the area that is adjacent to the area to accommodate battery 130 and that extends along the lower side part of lower housing 114. Circuit board 127 is attached on reinforcing conductive plate 125 in a state where the GND electrically connects with reinforcing conductive plate 125. Thus, inside lower housing 114, on one surface side (i.e. back surface side of housing 110) of reinforcing conductive plate 125 arranged on virtually the entire surface from a plan view, circuit board 121, battery 130 and circuit board 127 are aligned on the surface along back surface 114. That is, similar to circuit board 121, circuit board 127 is also disposed inside lower housing 114 without overlapping the area to accommodate battery 130, in the thickness direction, so that lower housing 114 itself is made thinner.

Figure 3:
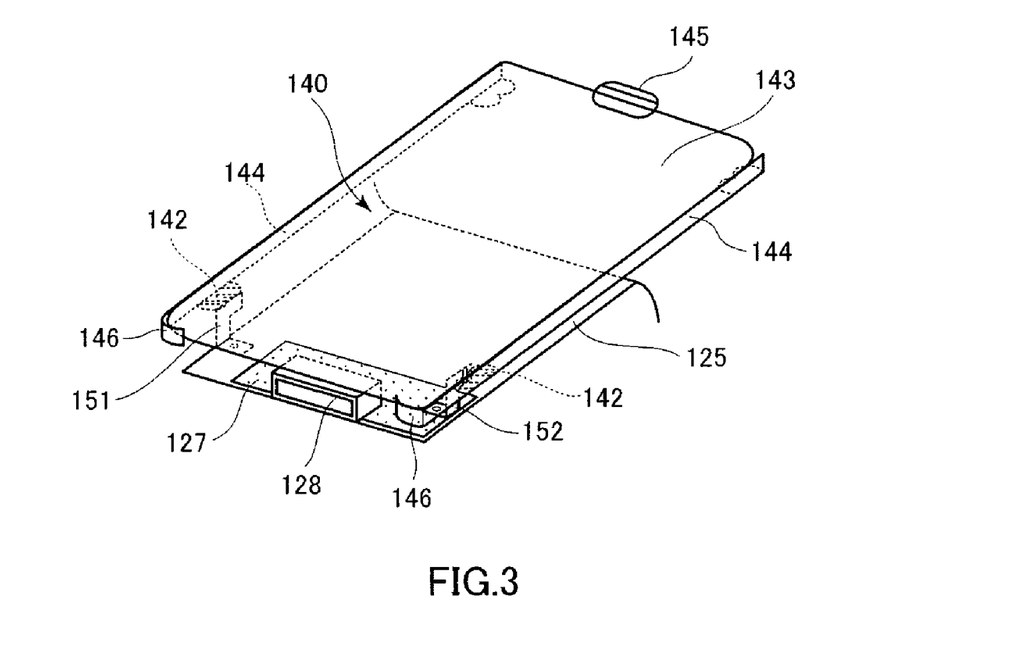
FIG. 3 is a main part configuration diagram showing a state in which a battery lid part and a circuit board inside a lower housing are connected in a mobile telephone that is a mobile radio apparatus according to Embodiment 1 of the present invention.
Figure 4:
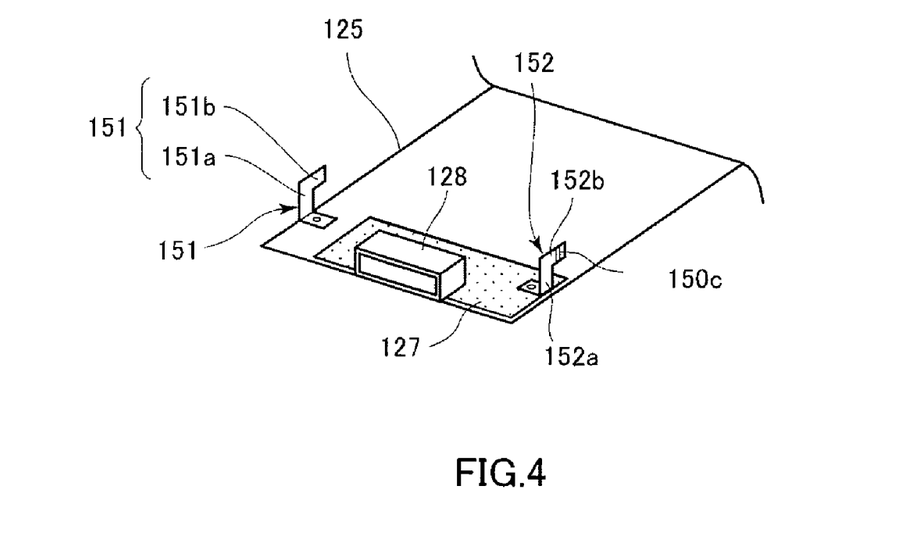
FIG. 4 shows a connection portion on the lower housing side of the mobile radio apparatus according to Embodiment 1 of the present invention.
Figure 5:
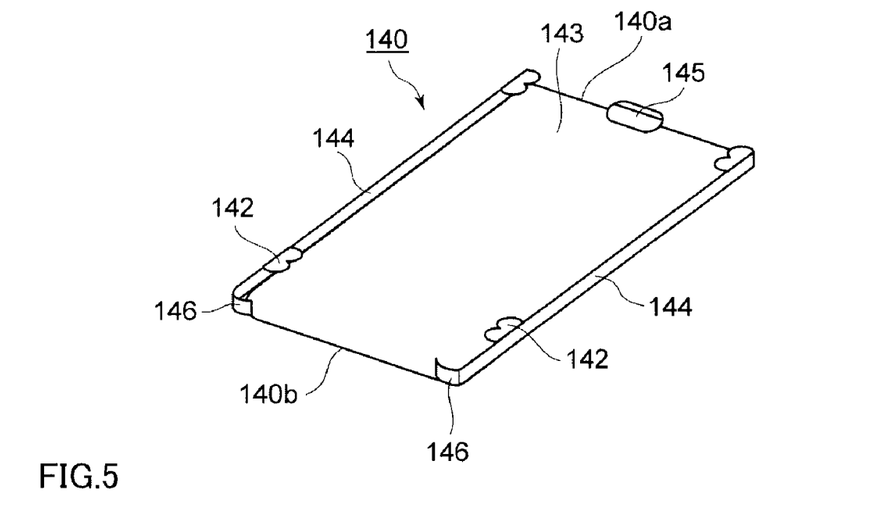
FIG. 5 shows the backside of a battery lid part.

FIG. 3 is a main part configuration diagram showing a state in which the battery lid part and the circuit board inside the lower housing are connected in the mobile telephone that is the mobile radio apparatus according to Embodiment 1 of the present invention, FIG. 4 shows the connection portion on the lower housing side of the mobile radio apparatus according to Embodiment 1 of the present invention and FIG. 5 shows the backside of the battery lid part.

On circuit board 127, external interface connector 128 is mounted and charging element 129 that is exposed in the lower side part of lower housing 114 is connected. Further, in FIG. 1, external interface connector 128 is provided so as to be exposed outside by removing a connector cap part that is detachably attached to the opening part of the lower end surface of lower housing 114.

In the area of reinforcing conductive plate 125 on which this circuit board 127 is mounted, that is, in the area that is adjacent to the area to accommodate battery 130, in reinforcing conductive plate 125 and that extends along the lower side part of lower housing 114, contact members 151 and 152 that electrically connect with battery lid part 140 are provided to rise on the back surface 115 side.

To be more specific, contact members 151 and 152 are formed with electrically conductive members, and contact member 151 is provided to rise from one side part of reinforcing conductive plate 125 that extends along one side surface of housing 114, in a state of electrical connection with this reinforcing conductive plate 125.

Further, in reinforcing conductive plate 125, contact member 152 is arranged to face contact member 151 in a position apart from contact member 151 in the width direction. Here, contact member 152 is provided to rise from circuit board 127, and electrically connects to reinforcing conductive plate 125 through the GND pattern of circuit board 127. Further, the GND pattern of one surface side connected with contact member 152 in circuit board 127 electrically connects to reinforcing conductive plate 125 on the other surface side through a through-hole.

As shown in FIG. 3 and FIG. 4, these contact members 151 and 152 connect to battery lid part 140 attached to lower housing 114, in the positions apart from each other.

As shown in FIG. 4, contact members 151 and 152 are formed by processing electrically conductive metal plates, and has: rising strip parts 151a and 152a that rise from reinforcing conductive plate 125; and contact strip parts 151b and 152b that extend vertically from the front ends of rising strip parts 151a and 152a to the upper end side of lower housing 114 to contact battery lid part 140 through contact points 150c.

Rising strip parts 151a and 152a are both formed in a flat shape, and are provided along the inner wall surfaces of both sidewall parts of lower housing 114.

These contact members 151 and 152 have flexibility to elastically deform in a direction to face each other, and the parts in which contact points 150c are formed in contact strip parts 151b and 152b are exposed outside through the opening parts formed in both side surface parts of lower housing 114 (see FIG. 1).

Contact members 151 and 152 are formed in desired positions in reinforcing conductive plate 125 or in circuit board 127. By changing the positions to form these contact members 151 and 152, it is possible to adjust the coupling factor between a metal top panel and battery lid part 140, so that, when mobile telephone 100 is laid on a metal top panel, it is possible to adjust the resonance frequency of monopole antenna 122 to the desired frequency.

Further, when battery lid part 140 is attached to lower housing 114, contact members 151 and 152 engage with claw parts 142 that are provided to project inward from sidewall parts 144 of battery lid part 140.

As shown in FIG. 5, battery lid part 140 is formed by processing an electrically conductive, flat member (here, an electrically conductive metal plate). Note that this battery lid part 140 may include an electrically conductive member containing an insulator. By adjusting this insulator, it is possible to change the effective length of battery lid part 140 and adjust the coupling factor between battery lid part 140 and a metal top panel, so that, when mobile telephone 100 is laid on a top panel of a metal desk, it is possible to adjust the resonance frequency of monopole antenna 123.

With battery lid part 140, both sidewall parts 144 hang from the side rim parts of upper surface part 143 that forms a part of back surface 115 when battery lid part 140 is attached to lower housing 114, and claw parts 142 are formed to project inward along upper surface part 143 from positions meeting contact points 150c in the front end side parts of both sidewall parts 144.

Both sidewall parts 144 cover the rim parts on the back surface 115 side in both side surfaces of lower housing 114 when battery lid part 140 is attached to lower housing 114.

Further, upper claw part 145 that engages with upper side rim part 117a (see FIG. 1) of battery box 117, in the backside of the back surface portion, is formed in upper end side part 140a of battery lid part 140, and battery lid part 140 is attached to lower housing 114 by making battery lid part 140 cover battery box 117 from a slightly displaced position, sliding battery lid part 140 to the upper side of lower housing 114 and making upper claw part 145 and claw parts 142 engage with upper end rim part 117a (see FIG. 1) and contact points 150c, respectively. Thus, claw parts 142 and contact members 151 and 152 form a lock mechanism for holding battery lid part 140 detachably in lower housing 114, and, when battery lid part 140 is attached and fixed to lower housing 114, battery lid part 140 connects to reinforcing conductive plate 125 through contact members 151 and 152 and the GND plane of circuit board 127, and the GND plane of circuit board 121 connects to reinforcing conductive plate 125 so as to become the GND of power feeding point 124 and function as the ground plate of monopole antenna 123.

Further, in both end parts of lower end side part 140b of battery lid part 140, ribs 146 that extend vertically from both sidewall parts 144 along lower end side part 140b are formed. These ribs 146 determine the position of battery lid part 140 in a direction in which battery lid part 140 is moved sliding along back surface part 115 of lower housing 114.

In mobile telephone 100 configured as described above, circuit board 121, battery 130 and circuit board 127 are aligned on virtually the entire surface of a planar area inside lower housing 114, that is, on the surface of reinforcing conductive plate 125 on the back surface 115 side that is arranged on the operation surface side opposite to back surface 115.

Reinforcing conductive plate 125 is formed in a cover portion of lower housing 114 by insertion molding, and is arranged to face battery lid part 140 that covers battery 130, on the back surface side of battery 130 placed to face the parts arranged in lower area 114a.

On reinforcing conductive plate 125, monopole antenna 123 that connects to circuit board 121 through power feeding point 124 is short-circuited through the GND pattern of circuit board 121 and connects and conducts with battery lid part 140 through contact member 151, contact member 152 and circuit board 127. That is, reinforcing conductive plate 125 connects with metal battery lid part 140 through two or more contact points of contact members 151 and 152 that form a lock mechanism for attaching battery lid part 140 to lower housing 114.

Mobile telephone 100 has: lower housing 114 that has bottom surface 115 exposed outside on the opposite side of the operation surface; circuit board 121 that is arranged inside lower housing 114 and that has power feeding point 124 of antenna 123 and a planar conductive layer to be connected to power feeding point 124; electrically conductive battery lid part 140 that is detachably attached to lower housing 114 and that becomes a part of bottom surface 115; electrically conductive reinforcing conductive plate 125 that is arranged apart from bottom surface 115 and along bottom surface 115 to overlap circuit board 121, and that connects to the electrically conductive layer of circuit board 121; and contact members 151 and 152 that are provided and connected with reinforcing conductive plate 125 and that contact battery lid part 140 attached to lower housing 114. In other words, mobile telephone 100 has inside: lower housing 114 that has reinforcing conductive plate 125 connected to power feeding point 124 of antenna 123 on circuit board 121; battery lid part 140 that is detachably attached to lower housing 114 and that becomes a part of back surface 115 (i.e. bottom surface) of lower housing 114; and contact members 151 and 152 that are provided inside lower housing 114 so as to conduct to above reinforcing conductive plate 125, and that contact battery lid part 140 attached to lower housing 114.

Thus, in case where mobile telephone 100 is placed on an electrically conductive flat surface such as a metal top panel, battery lid part 140 and the metal top panel are mutually coupled, so that resonance is caused in the desired frequency band and a current is excited in contact members 151 and 152.

According to this configuration, it is possible to change the positions of contact members 151 and 152 between metal (i.e. electrically conductive) battery lid part 140 and reinforcing conductive plate 125 that is provided in lower housing 114 by insertion molding. That is, by changing the positions of contact members 151 and 152, it is possible to adjust the distance between contact members 151 and 152 and, consequently, the coupling factor between battery lid part 140 and the metal top panel changes, so that it is possible to adjust (i.e. control) the resonance frequency of monopole antenna 123 to the desired frequency.

Further, it is possible to form battery lid part 140 itself by a conductor containing an insulator, and, consequently, adjust the resonance frequency of monopole antenna 123 to the desired frequency.

Thus, with mobile telephone 100, reinforcing conductive plate 125 and battery lid part 140 are connected, so that it is possible to cause resonance in the desired frequency band, and make mobile telephone 100 smaller and thinner by saving space while improving antenna gain on a metal plate to secure antenna sensitivity for high performance.

That is, mobile telephone 100 differs from conventional art in requiring no distance between a circuit board and an element to be added to the circuit board, (i.e. height from the circuit board to the element) or requiring no spatial volume inside the housing, and in realizing an antenna configuration with a high degree of freedom by utilizing components (i.e. metal battery lid part 140 covering battery 130 to be accommodated in lower housing 114) required to make mobile telephone 100 thinner.

Note that, in mobile telephone 100 according to the present embodiment, battery lid part 140 may be configured to electrically connect to reinforcing conductive plate 125 connected to circuit board 127, through a reactance element (or reactance circuit).

Figure 6A:
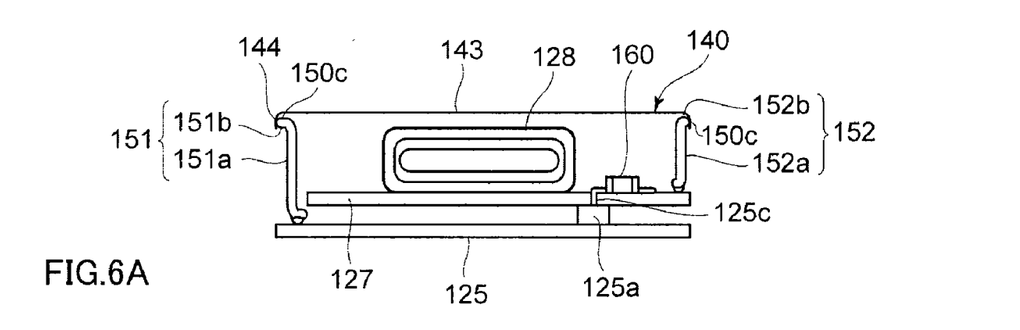
FIG. 6A is a side view showing a main part of portions connecting a battery lid part and contact members in a modified example of a mobile telephone according to Embodiment 1 of the present invention.
Figure 6B:
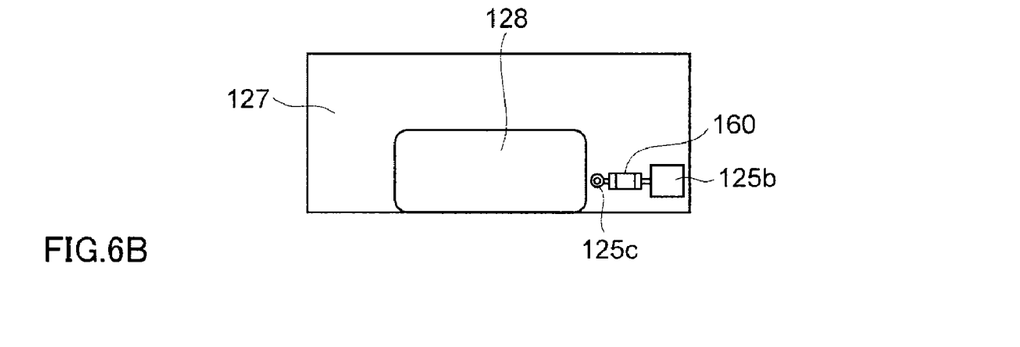
FIG. 6B is a plan view of a circuit board shown in FIG. 6A in a modified example of a mobile telephone according to Embodiment 1 of the present invention.

FIG. 6 shows a modified example of mobile telephone 100 according to Embodiment 1 of the present invention, and FIG. 6A is a side view showing main parts of portions connecting battery lid part 140 and contact members 151 and 152 and FIG. 6B is a plan view of the circuit board shown in FIG. 6A.

With the modified example of mobile telephone 100 shown in FIG. 6, reactance element 160 (i.e. reactance circuit), and contact member 152 and external interface connector 128 are mounted on the mounting surface of circuit board 127. To be more specific, on circuit board 127, reactance element 160 is provided between land 125b that connects with contact member 152 and throughhole 125c that is provided to penetrate circuit board 127 and that electrically connects to contact part 125a on the opposite surface of the mounting surface.

By this means, reinforcing conductive plate 125, with which antenna power feeding point 124 connects, connects to battery lid part 140 through reactance element 160 in high-frequency coupling when mobile telephone 100 is laid on a top panel of a metal desk.

That is, in case where battery lid part 140 and reinforcing conductive plate 125 are connected through reactance element 160, this makes it easy to make the effective length of battery lid part 140 variable and allows fine adjustment of the coupling factor between a metal top panel and battery lid part 140 when mobile telephone 100 is laid on a top panel of a metal desk. For example, mobile telephone 100 uses not only 2 GHz, but also 1.7 GHz and 800 MHz and the frequency band used in the mobile telephone is wide, so that it is easy to adjust the shape of reinforcing conductive plate 125 and the positions of contact members 151 and 152, and, additionally, acquire the good condition for the ground for the desired frequency.

By this means, even when mobile telephone 100 is placed on, for example, a metal top panel, it is possible to more effectively adjust the resonance frequency of the monopole antenna of mobile telephone 100, and maintain good reception sensitivity.

Embodiment 2

Figure 7:
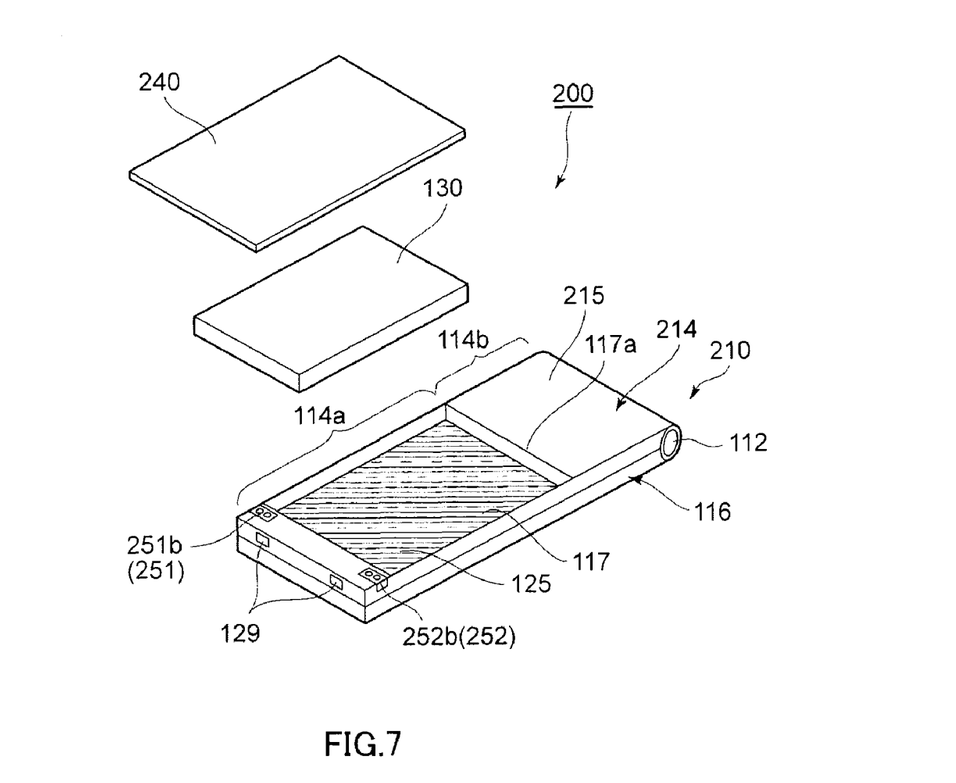
FIG. 7 is an exploded perspective view showing a main part configuration of a flip mobile telephone that is a mobile radio apparatus according to Embodiment 2 of the present invention.
Figure 8:
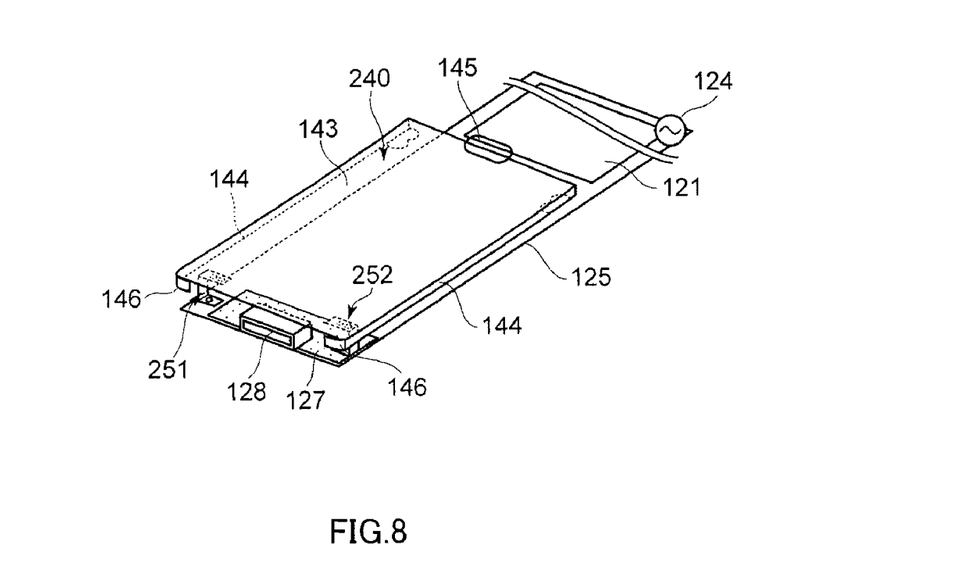
FIG. 8 is a main part configuration diagram showing a state in which a battery lid part and a circuit board inside a lower housing are connected in a mobile telephone that is a mobile radio apparatus according to Embodiment 2 of the present invention.
Figure 9:
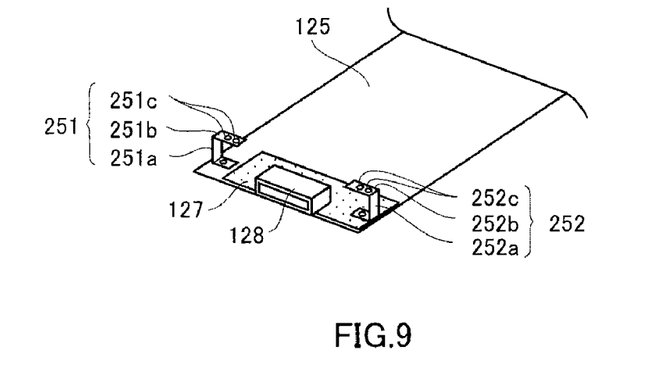
FIG. 9 shows a connection portion on the lower housing side of the mobile radio apparatus according to Embodiment 2 of the present invention.
Figure 10:
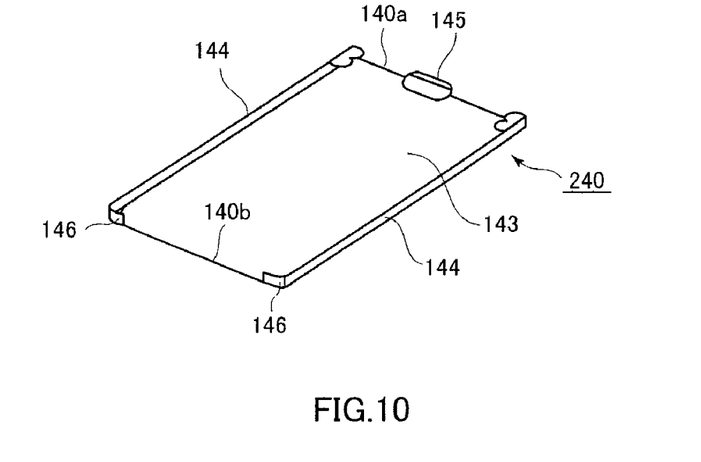
FIG. 10 shows a battery lid part from its backside.

FIG. 7 is an exploded perspective view showing a main part configuration of a flip mobile telephone that is a mobile radio apparatus according to Embodiment 2 of the present invention. Note that FIG. 7 shows the mobile telephone in a folded state, directing its back surface upward. Further, FIG. 8 is a main part configuration diagram showing a state in which a battery lid part and a circuit board inside a lower housing are connected in a mobile telephone that is a mobile radio apparatus according to Embodiment 2 of the present invention, FIG. 9 shows the connection portion on the lower housing side of the mobile radio apparatus according to Embodiment 2 of the present invention and FIG. 10 shows the battery lid part from its backside.

This mobile telephone 200 differs from corresponding mobile telephone 100 of Embodiment 1 shown in FIG. 1 in a configuration of contact members, and other components are the same. Therefore, the same components will be assigned the same reference numerals, and explanation thereof will be omitted.

Housing 210 of mobile telephone 200 shown in FIG. 7 employs a configuration in which first housing 214 (i.e. lower housing) and second housing 116 (i.e. upper housing) are attached to be mutually rotatable through hinge part 112 to make first housing 214 and second housing 116 foldable.

In bottom surface 215 (corresponding to the back surface of housing 210) of first housing 214, battery box 117 that accommodates battery 130 is formed open, and this battery box 117 is attached to first housing 214 and is covered by battery lid part 240 (i.e. first planar member) that forms a part of bottom surface 215. Further, bottom surface 215 is an outer surface that is exposed outside on the opposite side of the operation surface in first housing 214.

This mobile telephone 200 has the same main components as the main components of mobile telephone 100 (see FIG. 2), and, as shown in FIG. 8, battery lid part 240 electrically connects with reinforcing conductive plate 125 inside lower housing 214, through two points of contact members 251 and 252. These contact members 251 and 252 connect to battery lid part 140 attached to lower housing 214, in positions apart from each other. Note that, similar to reinforcing conductive plate 125 of mobile telephone 100, reinforcing conductive plate 125 connects with the GNDs of circuit board 121 and circuit board 127.

As shown in FIG. 7, lower housing 214 is configured like lower housing 114, and, in lower housing 214, an opening part, which is open apart in the width direction (i.e. lateral direction), is formed in a portion along the lower side part of the back surface to be covered by battery lid part 240. Further, the opening rim of battery box 117 that is formed in a concave shape in bottom surface 125 of lower housing 214 is formed by at least an insulating member. Here, lower housing 214 is formed with an insulating member (i.e. resin) similar to lower housing 114.

Contact strip parts 251b and 252b of contact members 251 and 252 are arranged being exposed outside, through this opening part. Here, contact strip parts 251b and 252b are arranged virtually coplanar with back surface 215 of housing 210 (i.e. the back surface of lower housing 214).

Similar to contact members 151 and 152, contact members 251 and 252 are formed by processing electrically conductive members (i.e. metal plates), rise vertically from reinforcing conductive plate 125 and circuit board 127 disposed to overlap reinforcing conductive plate 125 and contact battery lid part 240 through their front end parts.

To be more specific, as shown in FIG. 8 and FIG. 9, contact members 151 and 152 are formed by processing electrically conductive metal plates, and are provided with contact strip parts 251b and 252b that extend along back surface 215 from the front ends of rising strip parts 251a and 252a which rise from reinforcing conductive plate 125.

These contact strip parts 251b and 252b are formed in rising strip parts 251a and 252a to elastically deform in a direction to come close to reinforcing conductive plate 125, and have contact points 251c and 252c that project toward the back surface. These contact parts 251c and 252c are exposed outside from back surface 215, and contact upper surface part 143 of battery lid part 240 when battery lid part 240 is attached to lower housing 214.

Further, similar to contact members 151 and 152, these contact members 251 and 252 are formed in the desired positions in reinforcing conductive plate 125 or in circuit board 127. Here, contact members 251 and 252 are arranged in positions apart in the lateral direction when lower housing 214 is seen from a plan view, that is, in positions along the inner side surfaces of the both sidewall parts extending in the longitudinal direction of lower housing 214. By changing the positions to form these contact members 251 and 252, it is possible to adjust the resonance frequency of monopole antenna 123 to the desired frequency when mobile telephone 200 is placed on the top panel of a metal desk.

As shown in FIG. 10, battery lid part 240 employs a configuration that removes claw parts 142 from the configuration of battery lid part 140, and the functions of the same components are the same as the components of battery lid part 140.

That is, battery lid part 240 is formed by processing an electrically conductive, flat member (here, an electrically conductive metal plate). When battery lid part 240 is attached to lower housing 214, upper surface part 143 contacts contact points 251c and 252c and electrically connects with power feeding point 124 of the antenna through contact members 251 and 252. Further, similar to battery lid part 140, this battery lid part 240 may include an electrically conductive member containing an insulator. By adjusting this insulator, the effective length of battery lid part 240 that electrically connects with mobile telephone 200 through contact members 251 and 252, reinforcing conductive plate 125 and circuit boards 121 and 127, is changed, so that it is possible to adjust the coupling factor between a metal top panel and battery lid part 240 and, consequently, adjust the resonance frequency of monopole antenna 123 when mobile telephone 200 is placed on the top panel of a metal desk.

Thus, mobile telephone 200 has: lower housing 214 that has bottom surface 215 exposed outside on the opposite side of the operation surface; circuit board 121 that is arranged inside lower housing 214 and that has power feeding point 124 of antenna 123 and a planar conductive layer to be connected to power feeding point 124; electrically conductive battery lid part 240 that is detachably attached to lower housing 214 and that becomes a part of bottom surface 215; electrically conductive reinforcing conductive plate 125 that is arranged apart from bottom surface 215 and along bottom surface 215 to overlap circuit board 121, and that connects to the conductive layer of circuit board 121; and electrically conductive contact members 251 and 252 that are provided and connected with reinforcing conductive plate 125, and that contact battery lid part 240 attached to lower housing 214. In other words, mobile telephone 200 has inside: lower housing 214 that has reinforcing conductive plate 125 connected to power feeding point 124 of antenna 123 on circuit board 121; battery lid part 240 that is detachably attached to lower housing 214 and that becomes a part of back surface 215 (i.e. bottom surface) of lower housing 214; and contact members 251 and 252 that are provided inside lower housing 114 to conduct to above reinforcing conductive plate 125, and that contact battery lid part 240 attached to lower housing 214.

According to this configuration, it is possible to provide the same function and operation as mobile telephone 100. That is, with mobile telephone 200, it is possible to change the positions of contact members 251 and 252 between metal (i.e. electrically conductive) battery lid part 240 and reinforcing conductive plate 125 that is provided in lower housing 214 by insertion molding. That is, by changing the positions of contact members 251 and 252, it is possible to adjust the distance between contact members 251 and 252, so that it is possible to adjust (i.e. control) the resonance frequency of monopole antenna 123 to the desired frequency when mobile telephone 200 is placed on a top panel of a metal desk.

Further, it is possible to form battery lid part 240 itself by a conductor containing an insulator and, consequently, adjust the resonance frequency of monopole antenna 123 to the desired frequency.

Further, although battery lid part 240 employs a configuration that removes claw parts 142 from the configuration of battery lid part 140, battery lid part 240 may be provided with claw parts 142 as in the configuration of battery lid part 140. In this case, preferably, contact points 251c and 252c contact upper surface part 143 of battery lid part 240 between ribs 146 and claw parts 142. Ribs 146 extend vertically from both sidewall parts 144 along the lower end side part, so that it is possible to form corners where upper surface part 143, wall parts 144 and ribs 146 intersect and thereby improve rigidity. Further, claw parts 142 form the lock mechanism for holding battery lid part 240 in lower housing 114, and is united with lower housing 114 in the locked state. Hence, upper surface part 143 deflects little between ribs 146 that improve rigidity and claw parts 142 that is united with lower housing 144, so that contact points 251c and 252c can contact upper surface part 143 stably.

Thus, with mobile telephone 200, the top panel of a metal desk and battery lid part 240 are mutually coupled, so that it is possible to cause resonance in the desired frequency band, and make mobile telephone 200 smaller and thinner by saving space while improving antenna gain on a metal plate to provide high performance.

Further, similar to the modified example (see FIG. 6) of mobile telephone 100, with mobile telephone 200 according to the present embodiment, battery lid part 240 may employ a configuration in which battery lid part 240 electrically connects to reinforcing conductive plate 125 connected to power feeding point 124, through a reactance element.

Figure 11:
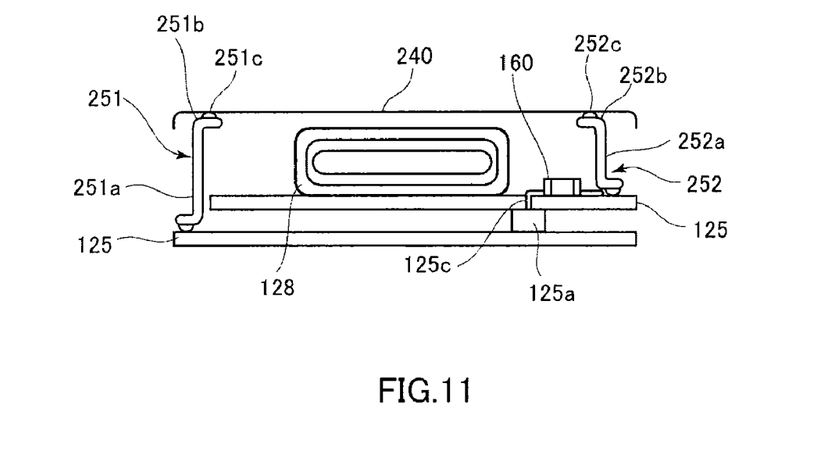
FIG. 11 shows a modified example of a mobile telephone according to Embodiment 2 of the present invention.

FIG. 11 shows a modified example of mobile telephone 200 according to Embodiment 2 of the present invention, and is a side view showing main parts of portions connecting battery lid part 240 and contact members 251 and 252.

With the modified example of mobile telephone 200 shown in FIG. 11, reactance element 160, contact member 152 and external interface connector 128 together are mounted on the mounting surface of circuit board 127. Note that the plan view of circuit board 127 on which reactance element 160 is mounted is the same as FIG. 6B showing the circuit board, and therefore explanation thereof will be omitted.

To be more specific, on circuit board 127, reactance element 160 is provided between a land (not shown) that connects with contact member 152 and throughhole 125c that is provided to penetrate circuit board 127 and that electrically connects to contact part 125a on the opposite surface of the mounting surface.

By this means, reinforcing conductive plate 125, to which antenna power feeding point 124 connects, connects to battery lid part 240 through reactance element 160 in high-frequency coupling when mobile telephone 200 is laid on the top panel of a metal desk.

Consequently, it is possible to provide the same function and operation as the modified example of mobile telephone 100, and more effectively adjust the resonance frequency of the monopole antenna of mobile telephone 200 particularly in a state where mobile telephone 200 is placed on, for example, a metal top panel.

Embodiment 3

Figure 12:
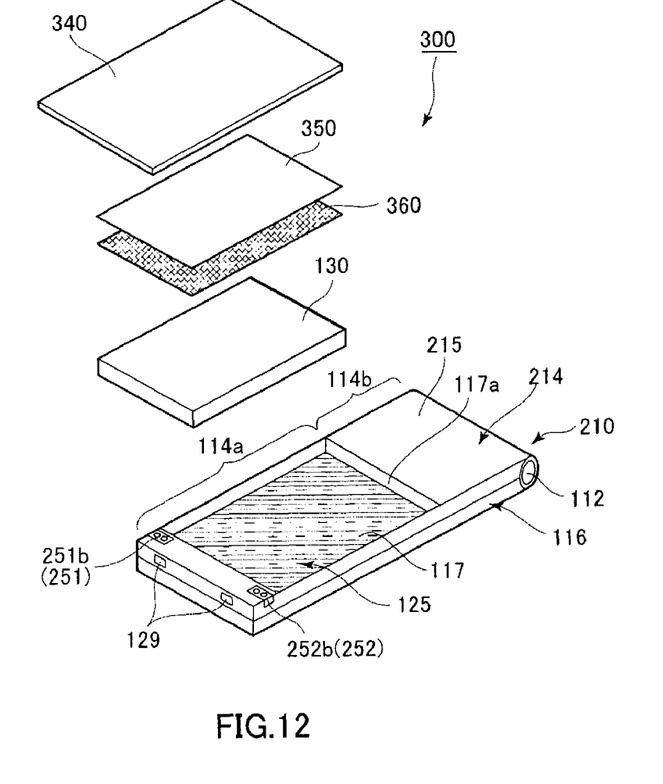
FIG. 12 is an exploded perspective view showing a main part configuration of a flip mobile telephone that is a mobile radio apparatus according to Embodiment 3 of the present invention.
Figure 14:
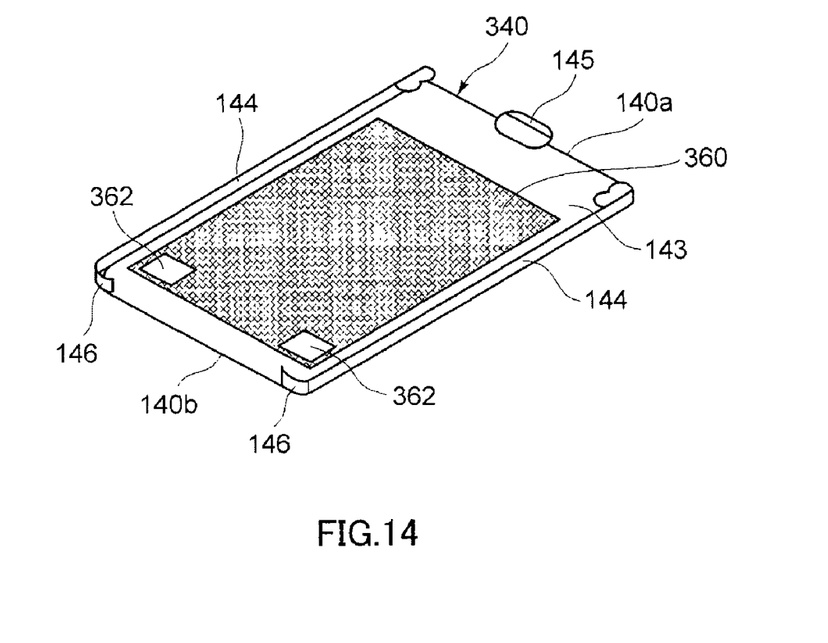
FIG. 14 shows from the back side the battery lid part of the mobile telephone according to Embodiment 3 of the present invention.
Figure 15:
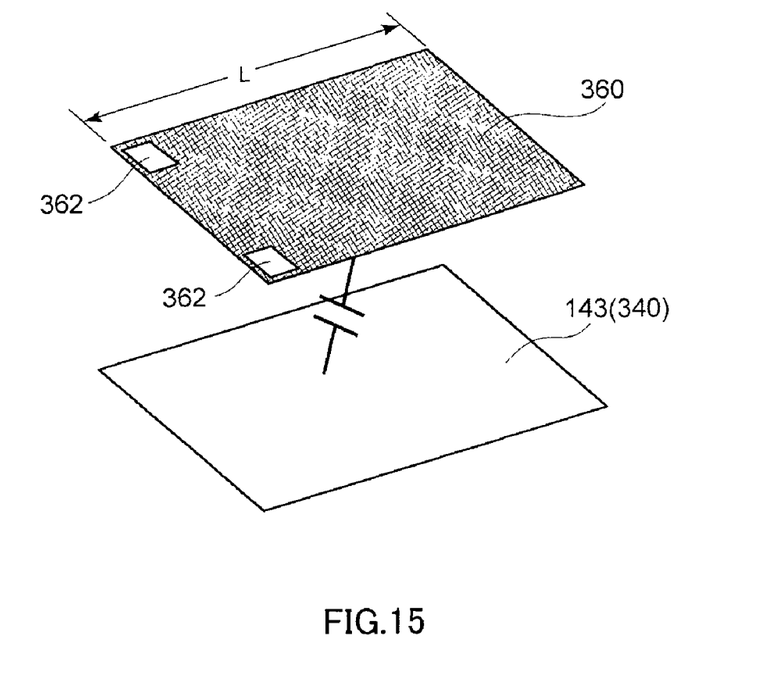
FIG. 15 is a schematic view showing the battery lid part of the mobile telephone according to Embodiment 3 of the present invention.

FIG. 12 is an exploded perspective view showing a main part configuration of a flip mobile telephone that is a mobile radio apparatus according to Embodiment 3 of the present invention. Note that FIG. 12 shows the mobile telephone in a folded state, directing its back surface upward. Further, FIG. 13 is a main part configuration diagram showing a state in which a battery lid part and a circuit board inside a lower housing are connected in a mobile telephone that is a mobile radio apparatus according to Embodiment 3 of the present invention, FIG. 14 shows from the backside the battery lid part of the mobile radio apparatus according to Embodiment 3 of the present invention and FIG. 15 is a schematic diagram of the battery lid part of the mobile radio apparatus according to Embodiment 3 of the present invention.

This mobile telephone 300 differs from corresponding mobile telephone 200 of Embodiment 2 shown in FIG. 7 in a configuration of battery lid part 340 (i.e. first planer member), and other components are the same. Therefore, the same components will be assigned the same reference numerals, and explanation thereof will be omitted.

As shown in FIG. 12, mobile telephone 300 has: housing 210 that is configured to be foldable when first housing 214 (i.e. lower housing) in which battery box 117 is formed in bottom surface 215 (corresponding to the back surface of housing 210) and second housing 116 (i.e. upper housing) rotate through hinge part 112; and battery lid part 340 that is attached to first housing 214 to cover battery box 117 and that forms a part of bottom surface 215.

Figure 13:
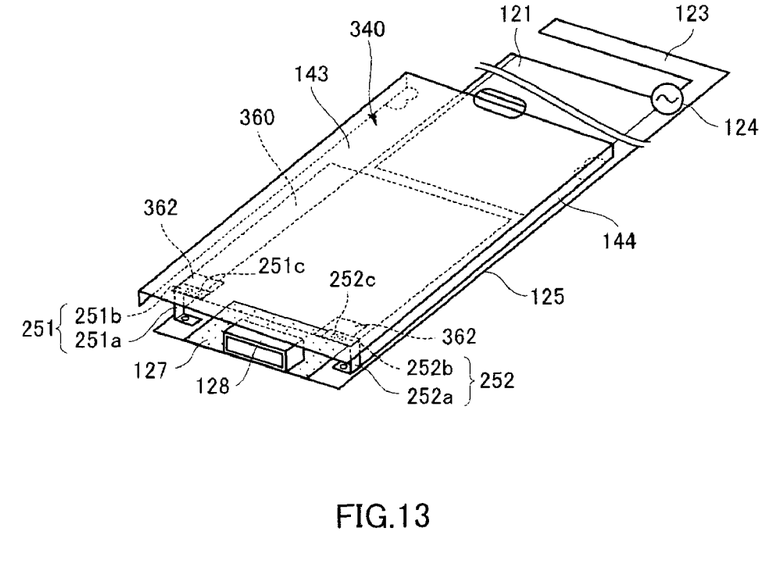
FIG. 13 is a main part configuration diagram showing a state in which a battery lid part and a circuit board inside a lower housing are connected in a mobile telephone that is a mobile radio apparatus according to Embodiment 3 of the present invention.

As shown in FIG. 13, mobile telephone 300 has the same main components as mobile telephone 200, and battery lid part 340 has the same basic configuration as battery lid part 240 and electrically connects with reinforcing conductive plate 125 inside lower housing 214, through two points of contact members 251 and 252.

These contact members 251 and 252 connect to battery lid part 340 attached to lower housing 214, in positions apart from each other (positions to part in the lateral direction when the lower housing is seen from a plan view). Note that, similar to reinforcing conductive plate 125 of mobile telephone 100, reinforcing conductive plate 125 is connected with the GNDs of circuit board 121 and circuit board 127 arranged inside lower housing 214.

As shown in FIG. 13 and FIG. 14, battery lid part 340 employs a configuration in which electrically conductive sheet 360 is pasted on the backside of upper surface part 143 of battery lid part 240 (see FIG. 8 and FIG. 10) of Embodiment 2, through insulation sheet 350 that has insulation property. Here, insulation sheet 350 is an adhesive sheet that has insulation property, and this insulation sheet 350 (i.e. adhesive sheet) is closely attached to upper surface part 143 and conductive sheet 360 is closely attached to insulation sheet 350. By this means, conductive sheet 360 is attached to battery lid part 340 sandwiching insulation sheet 350 with upper surface part 143.

With conductive sheet 360, contact pads 362 are provided to meet the positions of contact points 251c and 252c of contact strip parts 251b and 252b of contact members 251 and 252. These contact pads 362 contact points 251c and 252c of contact strip parts 251b and 252b of contact members 251 and 252 when battery lid part 340 is attached to lower housing 214.

Conductive sheet 360 is arranged a predetermined space (corresponding to the thickness of insulation sheet 350) apart from the backside of upper surface part 143 of battery lid part 340 facing the backside of upper surface part 143, and therefore stray capacitance is produced between upper surface part 143 and conductive sheet 360.

That is, as shown in FIG. 15, conductive sheet 360 is arranged a predetermined gap (which corresponds to the thickness of insulation sheet 350) apart from upper surface part 143, facing upper surface part 143, so that, by changing square S facing upper surface part 143, it is possible to adjust (i.e. control) the resonance frequency of monopole antenna 123 to the desired frequency when mobile telephone 300 is placed on the top panel of a metal desk.

Here, conductive sheet 360 is formed in a rectangular shape having the same width as upper surface part 143, and, consequently, it is possible to change square S facing upper surface part 143 by changing length L in the longitudinal direction. If a rectangular shape is formed by making length L longer, it is possible to decrease the resonance frequency of monopole antenna 123 and, if length L is made shorter to reduce the square facing upper surface part 143, it is possible to increase the resonance frequency. Further, with the configuration in which conductive sheet 360 is provided with contact pads 362 in both ends of the width direction (i.e. lateral direction) as in mobile telephone 300, length L in the longitudinal direction is changed securing the positions of contact pads 362. In case where the positions of contact pads 362 are changed, that is, the respective positions of contact members 251 and 252 are changed, the parts between contact pads 362 arranged in the changed positions are arranged along upper surface part 143 to connect with conductive sheet 360.

Although this mobile telephone 300 employs a configuration in which contact members 251 and 252 on the lower housing 214 side connect to conductive sheet 360 of battery lid part 340, the present invention is not limited to this as long as a configuration has the same functions.

That is, a configuration is possible in which one of contact members 251 and 252 contacts directly on upper surface part 143 of battery lid part 340.

Figure 16:
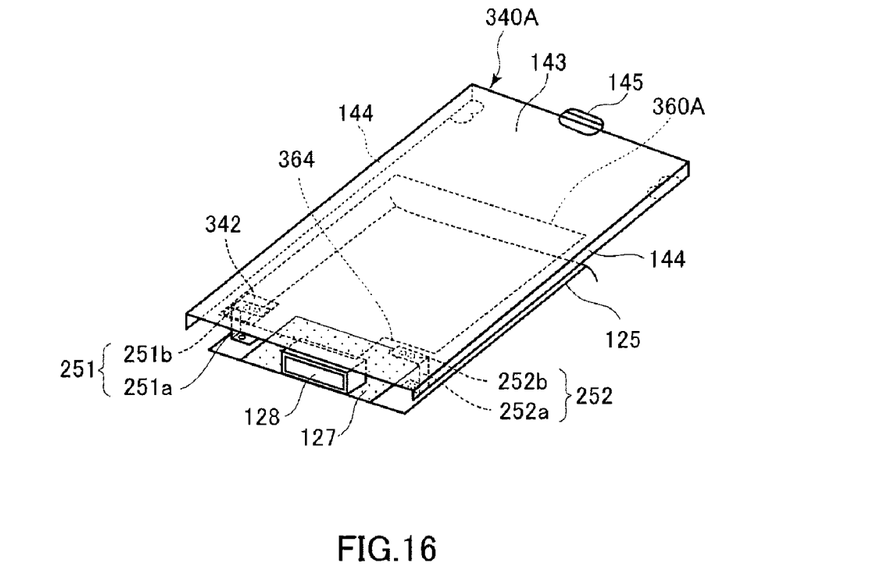
FIG. 16 is a main part configuration diagram for illustrating a modified example of a mobile telephone according to Embodiment 3 of the present invention.
Figure 17:
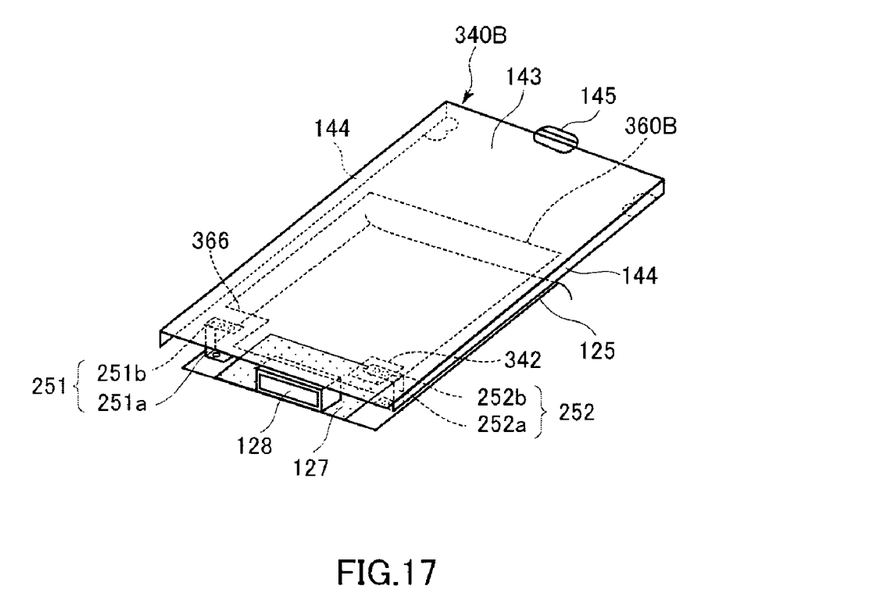
FIG. 17 is a main part configuration diagram for illustrating a modified example of a mobile telephone according to Embodiment 3 of the present invention.

FIG. 16 and FIG. 17 are main part configuration diagrams for illustrating a modified example of mobile telephone 300 according to Embodiment 3 of the present invention.

For example, FIG. 16 shows that, in conductive sheet 360A of mobile telephone 300, notch part 364 is formed by making a notch in a part in which a contact pad that contact member 252 contacts, is provided. By this means, when battery lid part 340A having the same lid body as battery lid part 340 is attached to lower housing 214, contact member 252 directly contacts the part in the backside of upper surface part 143 which is exposed inside notch part 366.

Further, FIG. 17 shows that, in conductive sheet 360B of mobile telephone 300, notch part 366 is formed by making a notch in a part in which a contact pad that contact member 251 contacts, is provided. By this means, when battery lid part 340B having the same lid body as battery lid part 340 is attached to lower housing 214, contact member 251 directly contacts the part in the backside of upper surface part 143 which is exposed inside notch part 364.

The modified example of mobile telephone 300 shown in FIG. 16 and FIG. 17 can provide the same function and operation as the configurations shown in FIG. 12 to FIG. 14.

Further, with mobile telephone 300 according to Embodiment 3, the structure for connecting contact members and a battery lid part may employ the same configuration as in contact members 151 and 152 of mobile telephone 100 according to Embodiment 1. In this case, battery lid part 340 is configured such that conductive sheet 360 is disposed through insulation sheet 350 up to the portion that claw parts 142 contacting contact strip parts 151b and 152b of contact members 151 and 152 contact.

Further, it is possible to provide a reactance element in a wiring of at least one of contact members 251 and 252, in a configuration connecting reinforcing conductive plate 125 and circuit board 127 and battery lid part 340 through two points of contact members 251 and 252. In this case, as shown in, for example, FIG. 6 or FIG. 11, a configuration is possible in which, on circuit board 127, the reactance element is provided between land 125b that connects with contact member 152 or 252 and throughhole 125c that is provided to penetrate circuit board 127 and that electrically connects to contact part 125a on the opposite surface of the mounting surface. This makes it easy to adjust the coupling factor between a metal top panel and battery lid part 340 when mobile telephone 300 is laid on a top panel of a metal desk, and allows fine adjustment of a current distribution in the desired frequency. Consequently, the frequency band used in the mobile telephone is wide, so that it is easy to adjust the shape of reinforcing conductive plate 125 and the positions of contact members 151 and 152, and, additionally, acquire the good condition for the ground for the desired frequency.

Further, although, with the above embodiments, reinforcing conductive plate 125 in mobile telephones 100, 200 and 300 is formed in lower housing 114 and 214 by insertion molding, the present invention is not limited to this. With mobile telephones 100, 200 and 300 according to the above embodiments, reinforcing conductive plate 125 is insertion-molded in lower housing 114 and 214, so that the housing itself is made thinner.

Further, with embodiments 100, 200 and 300, battery lid parts 140, 240, 340, 340A and 340B that cover battery 130 accommodated inside the housing (here, lower housings 114 and 124), is formed with a metal plate, so that the housing is made thinner while securing its rigidity.

Furthermore, with the above embodiments, lower housings 114 and 214 to which battery lid parts 140, 240, 340, 340A and 340B are attached is configured to be molded by insulating resin. Lower housings 114 and 214 may be configured in any way as long as battery lid parts 140, 240, 340, 340A and 340B are attached to lower housings 114 and 214 to form the back surface of housings 110 and 210, and are connected to the GND conductors of circuit board 121 and circuit board 127, through two points of contact members 151, 152, 251 and 252 on reinforcing conductive plate 125.

The mobile telephone according to the present invention is not limited to the above embodiments, and can be variously implemented.

The disclosure of Japanese Patent Application No. 2008-006314, filed on Jan. 15, 2008, including the specification, drawings and abstract, is incorporated herein by reference in its entirety.

INDUSTRIAL APPLICABILITY

The mobile radio apparatus according to the present invention provides an advantage that the mobile radio apparatus can maintain good reception sensitivity when it is laid on a metal top panel and can be made thinner, and is useful as a mobile telephone.

The invention claimed is:
1. A mobile radio apparatus comprising:
a housing that comprises an operation surface and an outer surface which is exposed outside on an opposite side of the operation surface;
an antenna;
a substrate that is arranged inside the housing and that comprises a power feeding point of the antenna and a planar conductive layer;
an electrically conductive first planar member that is detachably attached to the housing and that becomes a part of the outer surface; and
a contact member that electrically connects with the conductive layer and that contacts the first planar member.

2. The mobile radio apparatus according to claim 1, further comprising an electrically conductive second planar member that is arranged along the operation surface to overlap the substrate, and that electrically connects to a conductive layer of the substrate and connects with the contact member.

3. The mobile radio apparatus according to claim 2, further comprising a surrounding wall part that rises from a peripheral part of the outer surface toward the operation surface, and that comprises inner wall surfaces facing each other,
wherein the second planar member is provided bridging between the inner wall surfaces inside the housing.

4. The mobile radio apparatus according to claim 1, wherein the first planar member except the contact member is attached to a part of the insulating housing.

5. The mobile radio apparatus according to claim 1, wherein:
the housing comprises in the outer surface a concave part that accommodates a battery; and
the first planar member is a battery lid to cover the battery.

6. The mobile radio apparatus according to claim 5, wherein:
between the operation surface and the outer surface, the housing comprises a first area and a second area that is adjacent to the first area along the operation surface;
the substrate is arranged in the first area; and
the battery is arranged in the second area.

7. The mobile radio apparatus according to claim 1, wherein the contact member electrically connects to the conductive layer through a reactance circuit.

8. The mobile radio apparatus according to claim 1, wherein the contact member is formed with a first contact member and a second contact member that is arranged apart from the first contact member.

9. The mobile radio apparatus according to claim 8, wherein:
the housing is formed in a rectangular shape from a plan view;
the first planar member comprises a length corresponding to a length of the housing in a lateral direction; and
the first contact member and the second contact member are arranged apart in the lateral direction of the housing from a plan view.

10. The mobile radio apparatus according to claim 8, further comprising:
an insulation sheet that is closely attached to a surface of the first planar member on a housing side; and
a conductive sheet that is closely attached to the insulation sheet and that sandwiches the insulation sheet with the first planar member, wherein:
the first contact member contacts the first planar member; and
the second contact member contacts the conductive sheet.

11. The mobile radio apparatus according to claim 8, further comprising:
an insulation sheet that is closely attached to a surface of the first planar member on a housing side; and
a conductive sheet that is closely attached to the insulation sheet and that sandwiches the insulation sheet with the first planar member,
wherein the first contact member and the second contact member contact the conductive sheet.

12. The mobile radio apparatus according to claim 1, wherein:
the first planar member comprises an electrically conductive engaging part that detachably attaches the first planar member to the housing; and
the engaging part contacts the contact member.

13. The mobile radio apparatus according to claim 1, wherein:
the first planar member comprises:
an engaging part that detachably attaches the first planar member to the housing; and
a rib that extends vertically from a sidewall part along an end side part of the first planar member; and
the first planar member and the contact member contact between the engaging part and the rib.

14. The mobile radio apparatus according to claim 1, wherein:
the housing comprises:
a second housing that comprises a display surface and that is attached rotatably through a hinge part provided on a base end side; and
a first housing that comprises the display surface to face the operation surface when the second housing is folded through the hinge part;
the first planar member is attached to the housing as a part of an outer surface portion of the housing on an front end part side apart from the hinge part; and
the power feeding point is arranged on the substrate arranged inside the housing, closer to the hinge part than to the first planar member.

15. A mobile radio apparatus comprising:
a housing that comprises an outer surface;
an antenna;
a substrate that is arranged inside the housing and that comprises a power feeding point of the antenna and a planar conductive layer;
an electrically conductive first planar member that is detachably attached to the housing and that becomes a part of the outer surface; and
an electrically conductive contact member that electrically connects with the conductive layer and that contacts the first planar member.

* * * * *

UNITED STATES PATENT AND TRADEMARK OFFICE
CERTIFICATE OF CORRECTION

PATENT NO. : 8,203,493 B2  
APPLICATION NO. : 12/812452  
DATED : June 19, 2012  
INVENTOR(S) : Kenichi Sato et al.

Page 1 of 1

It is certified that error appears in the above-identified patent and that said Letters Patent is hereby corrected as shown below:

Cover Page, Item (75):
"Kenichi Sato, Miyagi (JP); Daigo Imano, Miyagi (JP); Hironori Kikuchi, Miyagi (JP); Yasuhiro Katajima, Kanagawa (JP); Tatsuya Sano, Miyagi (JP); Nobuhiro Iwai, Kanagawa (JP)" should read, --Kenichi Sato, Miyagi (JP); Daigo Imano, Miyagi (JP); Hironori Kikuchi, Miyagi (JP); Yasuhiro Kitajima, Kanagawa (JP); Tatsuya Sano, Tokyo (JP); Nobuhiro Iwai, Kanagawa (JP)--.

Signed and Sealed this  
Twenty-eighth Day of August, 2012

David J. Kappos  
*Director of the United States Patent and Trademark Office*